VENTING OF TIRE MOLDS

Filed April 13, 1967 5 Sheets-Sheet 1

INVENTOR
LEONARD C. YOUNGBLOOD
PETER P. ZAFFARONI
CASMER S. JABLONSKI

HENRY STERNBERG
ATTORNEY.

VENTING OF TIRE MOLDS

Filed April 13, 1967 5 Sheets-Sheet 2

INVENTOR.
LEONARD C. YOUNGBLOOD
PETER P. ZAFFARONI
CASMER S. JABLONSKI

HENRY STERNBERG
ATTORNEY.

VENTING OF TIRE MOLDS
Filed April 13, 1967
Fig. 4
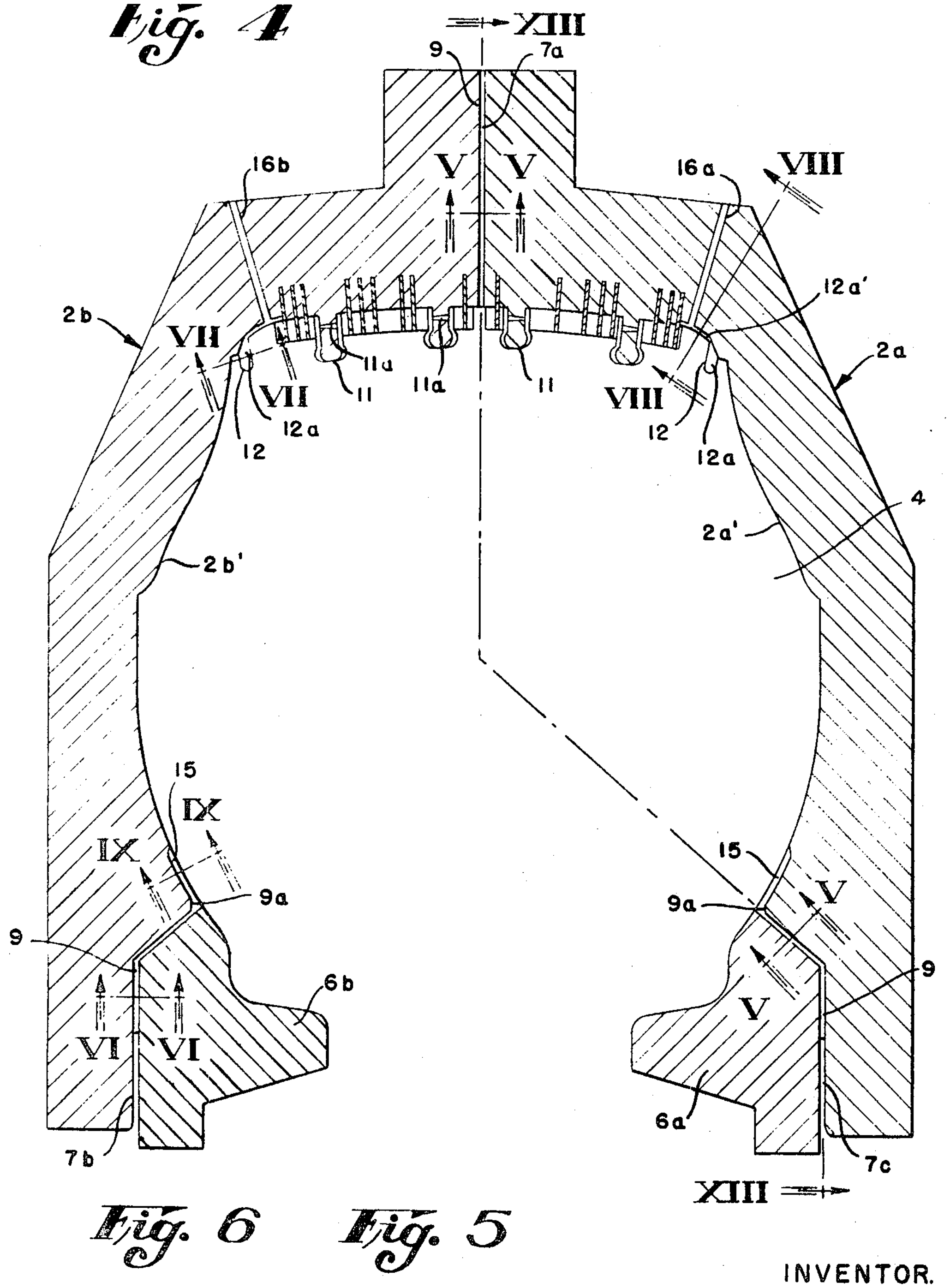
Fig. 6 Fig. 5
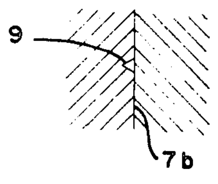
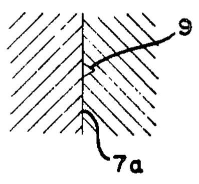
INVENTOR.
LEONARD C. YOUNGBLOOD
PETER P. ZAFFARONI
CASMER S. JABLONSKI
HENRY STERNBERG
ATTORNEY.

Sept. 23, 1969 L. C. YOUNGBLOOD ET AL 3,467,989

VENTING OF TIRE MOLDS

Filed April 13, 1967 5 Sheets-Sheet 4

INVENTOR.
LEONARD C. YOUNGBLOOD
PETER P. ZAFFARONI
CASMER S. JABLONSKI

HENRY STERNBERG
ATTORNEY.

VENTING OF TIRE MOLDS

INVENTOR.
LEONARD C. YOUNGBLOOD
PETER P. ZAFFARONI
CASMER. S. JABLONSKI

HENRY STERNBERG
ATTORNEY.

United States Patent Office 3,467,989
Patented Sept. 23, 1969

3,467,989
VENTING OF TIRE MOLDS

Leonard C. Youngblood, Grosse Pointe Park, and Peter P. Zaffaroni and Casmer S. Jablonski, Detroit, Mich., assignors to Uniroyal, Inc., New York, N.Y., a corporation of New Jersey
Filed Apr. 13, 1967, Ser. No. 630,594
Int. Cl. B29h 5/02
U.S. Cl. 18—38 13 Claims

ABSTRACT OF THE DISCLOSURE

A tire vulcanizing mold whose independent, cavity-defining, mold sections have vent grooves provided at their interfaces and a pair of diametrically opposite through conduits in the tread-forming region, through which air, trapped between the tire and the mold surfaces can escape to the exterior of the mold, said through-conduits and said grooves constituting the sole escape paths to the exterior of the mold for air trapped between the tire outer surface and the mold inner surface, thereby eliminating the need for literally hundreds of through-vents and the vent-rubber trimming operation necessarily required as a result thereof.

This invention relates generally to the venting of trapped gaseous medium in tire molds. More specifically, this invention relates to the venting of trapped gaseous medium from the tire molds provided with a minimum number of vent openings.

Conventionally, tire vulcanizing molds are provided with a multitude of vent holes extending through various parts thereof. The number of such vent holes may be of the order of 300 or more depending on the size and design characteristics of the tires to be molded. The tire rubber which follows expelled air into these conventional vents is called "vent rubber" and either breaks off in the vent holes during opening of the mold or remains on the tire as unsightly pin-shaped protrusions extending from the tire surface.

Any vent rubber which remains in the vent holes must be removed therefrom, while any vent rubber which remains on, and extends from, the tire surface must be trimmed, thus requiring additional operations and an expenses.

It is, therefore, a primary object of the present invention to provide a tire mold which will overcome the aforesaid disadvantages.

It is another object of the present invention to provide a tire mold which will not require the aforesaid large number of conventional drilled vent holes which can get clogged, and which will, therefore, not mold tires with unsightly vent rubber extending from the surface.

It is a further object of the present invention to provide a tire mold which allows trapped gaseous material to escape without requiring the extensive trimming operation now required on tires molded in conventional molds.

According to one form of the present invention the mold is provided with grooves at the interfaces of the various cavity-defining sections thereof, with only a pair of through vents extending through each of a pair of opposing mold sections in the tread forming regions thereof, said grooves and said through vents constituting the sole escape route for gaseous material trapped between the outer surface of the tire and the corresponding inner surface of the mold.

Other objects and advantages of the present invention will become apparent from the following description of the preferred form of the invention, reference being had to the accompanying drawings in which:

FIG. 4 is a sectional view taken along line X—X in the direction of the arrows of FIG. 1, showing the mold halves and the toe ring members in closed position of the mold;

FIG. 5 is an enlarged sectional view taken on the plane indicated by line V—V of FIG. 4, in the direction of the arrows;

FIG. 6 is another enlarged sectional view taken on the plane indicated by line VI—VI of FIG. 4, in the direction of the arrows;

Figure 1:
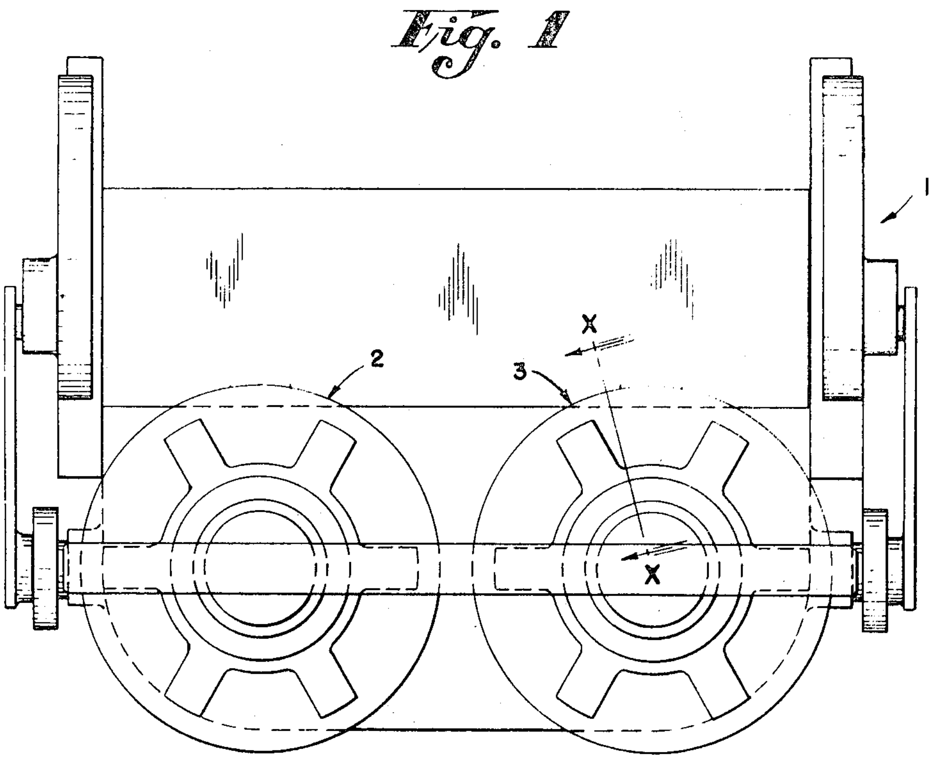
FIG. 1 is a top plan view of a tire vulcanizing press in accordance with the present invention.
Figure 2:
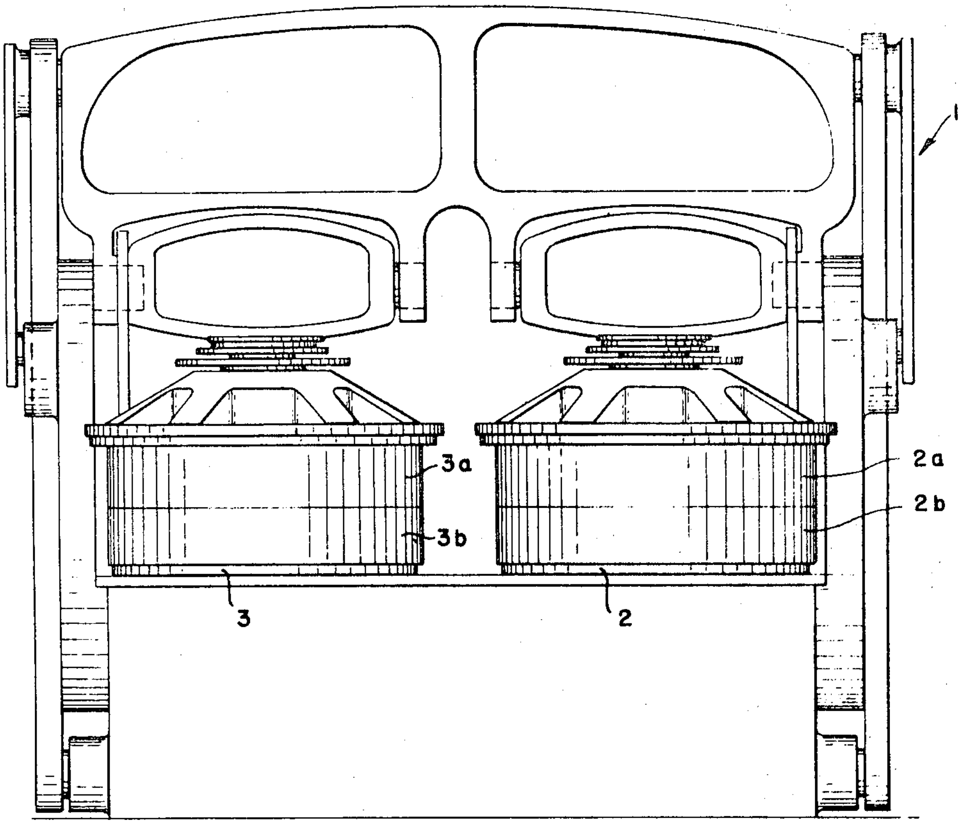
FIG. 2 is a rear elevational view of the press according to FIG. 1, showing a pair of tire molds thereon.
Figure 12:
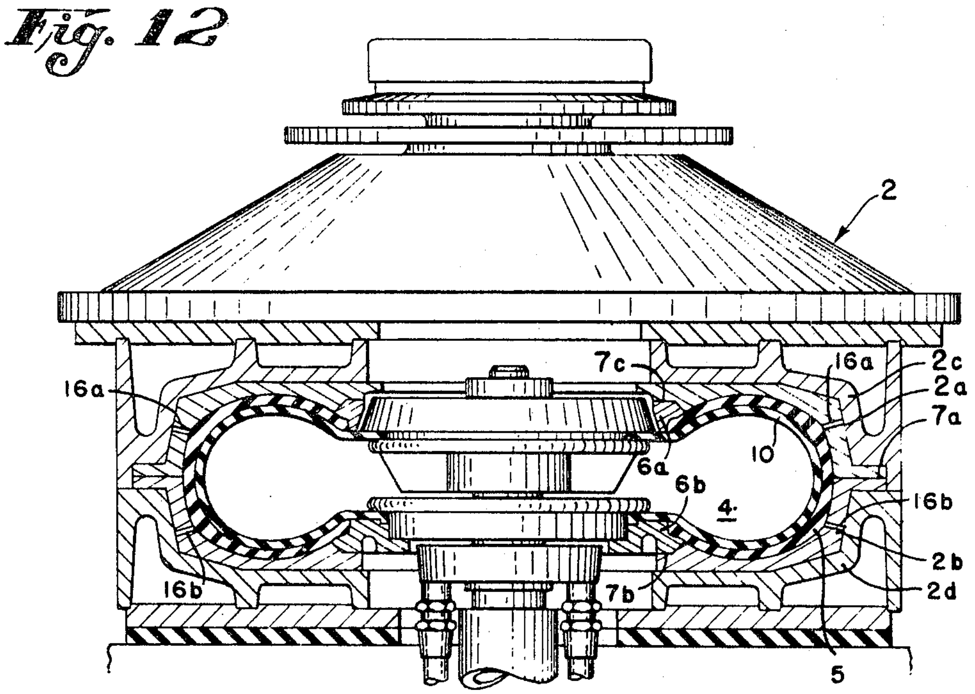
FIG. 12 is a transverse sectional elevation of a tire mold press for practicing the present invention.
Figure 13:
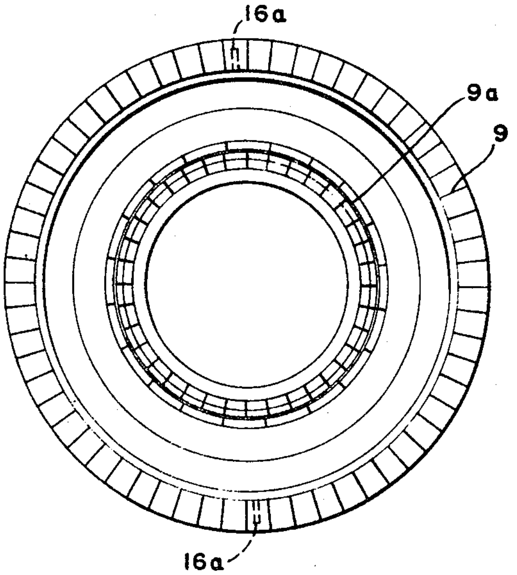
FIG. 13 is a plan view of one of a pair of opposed mold sections constructed according to the present invention.

Turning now to the drawings and first to FIGS. 1 and 2, the conventional curing press 1 has a pair of vulcanizing molds 2 and 3 having separable mold sections *2a*, *2b* and *3a*, *3b*, respectively. The mold sections *2a*, *2b* have inner mold surfaces *2a'*, *2b'* which define between themselves a space 4, as seen in FIG. 4, adapted to receive a tire carcass to be formed into a tire 5, as illustrated in FIGS. 12 and 13.

Each of the vulcanizing molds further includes conventional toe-ring members *6a* and *6b* for engaging the bead portion of the tire in the conventional manner. The upper and lower mold sections *2a* and *2b*, respectively, are relatively movable axially in the conventional manner with respect not only to each other, but also the lower mold section *2b* is movable with respect to the toe-ring member *6b* while upper tie-ring member *6a* moves with mold section *2a*, said mold sections and said toe-ring members forming between themselves interfaces *7a*, *7b* and *7c*, seen in FIG. 4.

According to the present invention, the mold is provided with venting means which provide escape paths for gaseous material trapped between the tire and the inner mold surfaces when the mold is in the shaping stages of closing and during final closing, i.e., when the mold sections *2a*, *2b*, *6a* and *6b* approach, and are in the position illustrated in FIG. 4. The venting means according to the present invention are located exclusively in the region of the existing interfaces *7a*, *7b* and *7c*, between the respective mold sections and in the tread-shoulder forming regions of the mold sections. The venting means preferably take the form of grooves 9 cut in the surface of one of the mold sections at its interface with another of said mold sections and at least 2 but no more than 4 through-conduits, or vents, through which the cavity communicates with the exterior of the mold and preferably with the atmosphere. Thus, as seen in FIGS. 4, 5, 6 and 13, interface grooves are provided in the interface surfaces of the respective mold sections. These grooves 9 extend radially and are distributed circumferentially over the respective surfaces at interfaces *7a*, *7b* and *7c*. Preferably, such radial grooves are provided at each interface circumferentially spaced approximately ¼" apart or of sufficient number to adequately exhaust the trapped gases. The grooves 9 are preferably V-shaped, as seen in FIGS. 5 and 6, and are preferably approximately .020 to .030 inch deep having a central angle of approximately 60°. The innermost portions of the radial grooves 9 communicate with the interior of the cavity 4 while the opposite end of each interface groove communicates, preferably with the atmosphere, at the exterior of the mold.

Additional, preferably circumferentially extending, grooves 9a are provided at the inner mold surface junction of the mold sections 2a and 2b, with the toe-rings 6a and 6b, respectively. The interface grooves 9, in this region, communicate with and are at substantially right angles to the circumferential grooves 9a.

Grooves 9 and 9a, it will be seen, facilitate the escape of gaseous material trapped between the outer surface of a tire 5 and portions of the inner mold surfaces 2a' and 2b' during shaping and mold closing stages and during the final molding and curing process.

Figure 10:
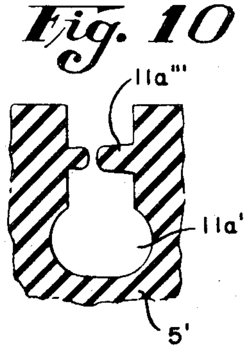
FIG. 10 is an enlarged transverse sectional view through a portion of a tire taken on the plane indicated by line X—X of FIG. 3 showing a groove formed in accordance with the present invention.
Figure 11:
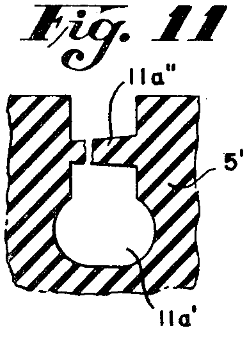
FIG. 11 is an enlarged transverse sectional view through a portion of another tire similar to FIG. 10 showing a groove formed in accordance with the present invention.

When the mold is closed, a partially formed, raw tire 5, located in the cavity 4, is pressed, by way of a conventional curing bag 10 having internal pressure applied thereto, against the sidewall and the tread-forming portions of the inner mold surfaces 2a' and 2b'. When portions of the tire 5 are thusly pressed against tread groove forming projections 11, it is possible that air trapped in compartments formed by such projections, by the outer tire surface, and by the inner mold surfaces, will not be able to reach the grooves 9, 9a previously described, unless additional lateral internal passages are provided. According to the present invention, therefore, substantially axially extending bores are provided through the circumferentially extending ribs 11, to provide lateral air passages therethrough for permitting air trapped in spaced regions of the tire mold to escape to the region of the parting line, i.e., interface *7a*. It being understood that the design forming elements 14 are provided with conventional air passages (not shown) therethrough as practiced by those skilled in the art. When molding pressure is applied in the conventional manner via the bag 10, some of the tire rubber will inevitably flow into the axial bores 11a. FIG. 11 shows filling vent rubber 11a'' which filled one of said bores 11a, having been broken upon removal of the tire from the mold. FIG. 10 shows a vent rubber 11a''', which did not entirely fill a bore 11a, extending from both sides of the tread groove toward the middle.

Figure 3:
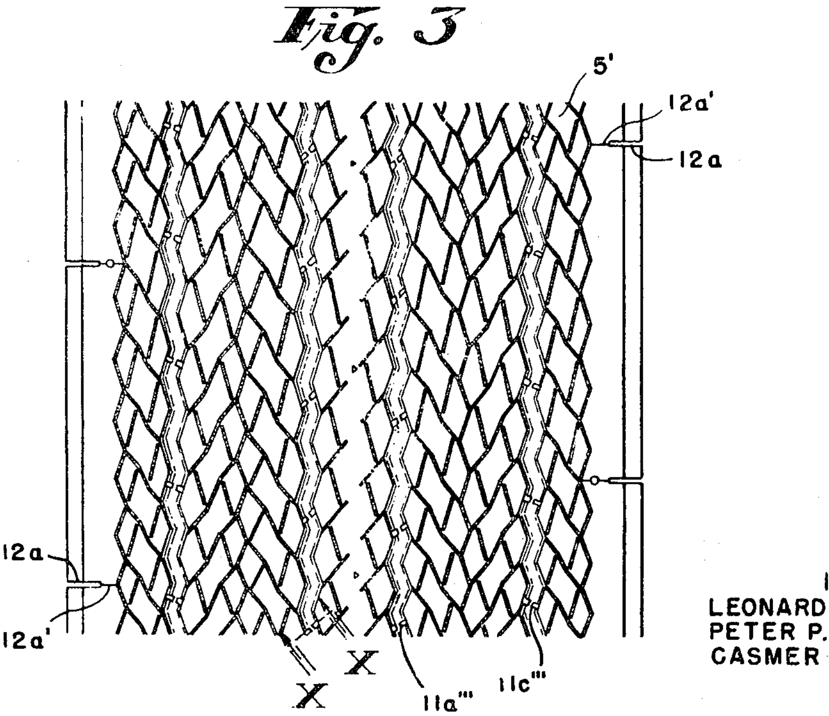
FIG. 3 is a partial plan view of a tire tread formed in a mold constructed according to the present invention.

FIG. 3 shows a portion of a tire tread cured in a mold according to the present invention with vent rubbers 11a''', remaining in the circumferentially extending groove portions of the tread.

Figure 7:
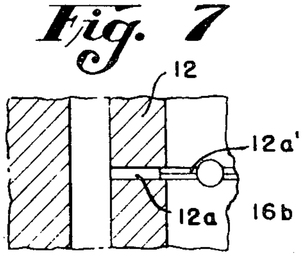
FIG. 7 is an enlarged sectional view taken on the plane indicated by line VII—VII of FIG. 4, in the direction of the arrows.
Figure 9:
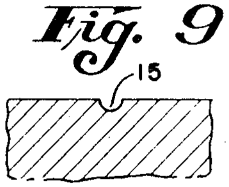
FIG. 9 is an enlarged sectional view taken on the plane indicated by line IX—IX of FIG. 4, in the direction of the arrows.
Figure 8:
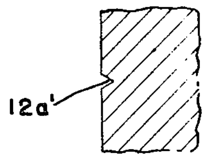
FIG. 8 is an enlarged sectional view taken on the plane indicated by line VIII—VIII of FIG. 4, in the direction of the arrows.
Figures 14, 15:
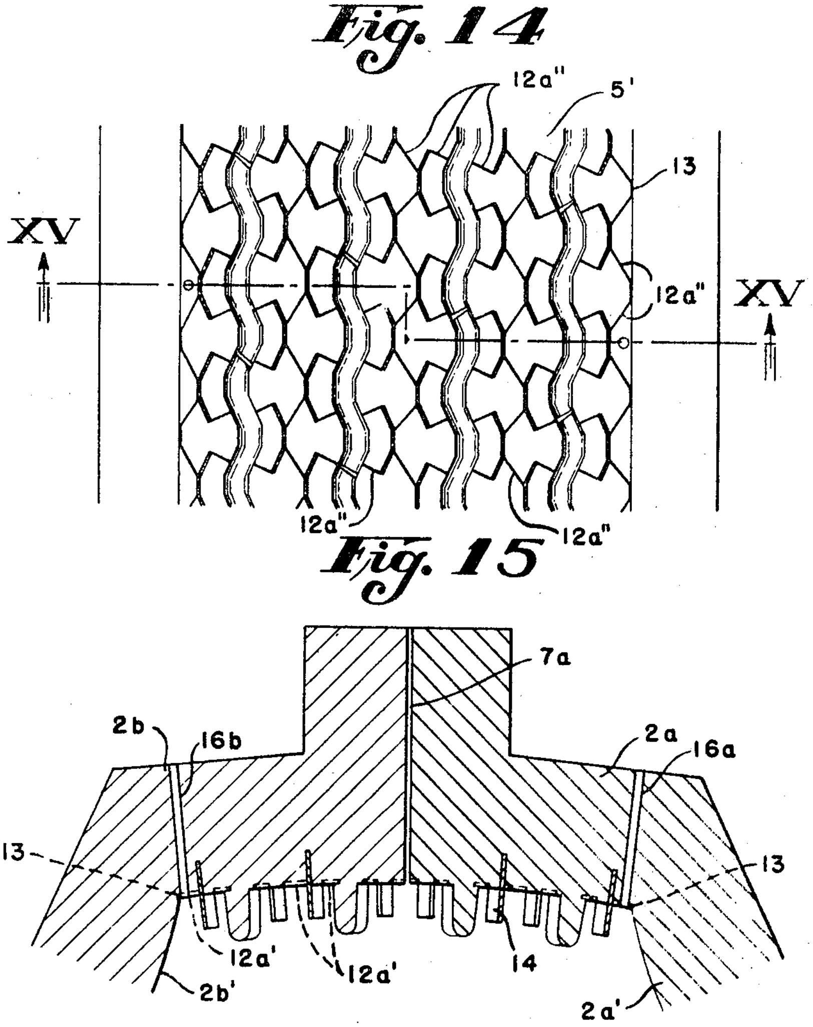
FIG. 14 is a plan view of a tread portion of a tire formed in a mold according to the present invention.
FIG. 15 is a partial sectional elevational view of a portion of the mold used in fabricating the tire illustrated in FIG. 14 with the view taken on the plane of the mold which would correspond to the plane indicated generally by line XV—XV of FIG. 14 in the direction of the arrows.

In order to facilitate the escape of the gaseous material also from the sidewall regions of the tire, additional passageways are preferably provided. Thus, for the same reasons as described above in connection with the axial bores, axial slots 12a are provided through the circumferentially extending shoulder-groove-forming projections 12. Cooperating with these axial slots 12a, there may be provided a plurality of circumferentially distributed, generally axially extending, "scratch vents" 12a', illustrated in FIGS. 4, 7 and 8. These slots and scratch vents all facilitate passage, of otherwise trapped air, from the sidewall-forming regions of the mold toward the parting line interface *7a*. In the tread design for a large size tire as illustrated, for example, in FIG. 14, the tread marks 12a'' which correspond to scratch vents 12a' are shown. It is seen that vents 12a' provide air passages, see FIG. 15, laterally through the entire tread pattern, connecting the insert configuration 14 to the circumferentially extending shoulder grooves 13 and also to the mold parting line at interface *7a*. It is to be understood that vents 12a are not necessary in all cases but are preferred for molding of tires having certain design, size or shape characteristics which prevent adequate lateral flow of gas, e.g., with heavy-duty, wide-ribbed tires having large spans of tread surface between the insert region and the grooves.

Additionally, for further facilitating the flow of trapped air within the mold cavity, there may be provided a plurality of generally radially extending sidewall flutes 15 distributed circumferentially along the inner mold surfaces 2a' and 2b', respectively, adjacent the corresponding toe-rings 6a, 6b. As seen in FIG. 4, these sidewall flutes 15 communicate directly with the corresponding circumferentially extending grooves 9a.

It is generally desirable to taper the axial-bores so that they have a smaller diameter end for the purpose of providing a relatively weaker section for the vent-rubber formed thereby to break at the adjoining tread rib. It will be noted that the axial-bores 11a act not only as air channels for directing the flow of air in desired directions but may also act as air reservoirs for any residual air which cannot otherwise escape.

According to the present invention a partially formed, raw tire, is placed into the mold cavity 4 in the conventional manner. The mold is closed in the conventional manner and, also as is conventional, pressure is applied to the interior of the tire, expanding the latter outwardly against the sidewall and tread forming portions of the mold surfaces 2a' and 2b'. In the shaping stage during the closing of the mold sections, with the tire therebetween, and during the final closing for molding the tire outer surface, as described, gaseous material trapped between mold and tire surface portions can escape toward and through the grooves 9, 9a, at interface regions *7a*, *7b* and *7c* and to the through-conduits 16a, 16b from whence it can escape to the atmosphere.

According to the present invention, therefore, and quite contrary to conventional molds where literally hundreds of through-vent passages are provided, particularly in the tread forming region of the mold, there are here provided only two, or at the most four, circumferentially spaced, through-vents, in each of the mold sections 2a and 2b. Preferably, the upper mold half 2a is provided with a pair of diametrically opposed through vents or through-conduits 16 in the tread-forming region thereof, near the shoulder-forming region 12. The two through conduits 16a of the upper mold section 2a and the two through conduits 16b of the lower mold section 2b are preferably all located in the same plane. It will be seen that the through conduits 16a, 16b are positioned so as to communicate with the nearest one of the axially directed slots 12a. The through conduits 16a, 16b, may according to the present invention, for passenger tire molds, be of the order of .070 inch diameter. A total of no less than four and no more than eight such through-conduits may be provided for the entire mold, while a total of four, i.e., two, diametrically opposed, through-conduits in each of sections 2a, 2b, are preferred. The natural parting line of the mold, i.e., interfaces *7a*, *7b* and *7c*, provided with grooves 9, as aforesaid, together with the above-mentioned small number of through-conduits 16a, 16b, provide the sole paths for escape of gaseous material trapped during the molding and curing process between the outer tire surface and the inner mold surface. No other escape paths to the exterior of the mold are provided nor are such necessary. To facilitate transfer of gaseous material, for example air, from distant regions of the mold surface toward either said interface grooves 9, or said pairs of through-conduits 16*a*, 16*b* there may be provided, at the interior of said mold, the aforedescribed axial slots 12*a*, the axially extending bores 11*a*, the radial flutes 15, and the "scratch-vents" 12*a'*, the latter being located on the crown-forming portion of the mold surface. Each of the latter facilitates movement of trapped air from one region of the mold to another during closing of the mold, during expansion of the tire toward and into engagement with the inner mold surfaces and during the remainder of the shaping and curing process.

While there has been described what is at present considered to be the preferred embodiment of this invention, it will be obvious to those skilled in the art that various changes and modifications may be made therein without departing from the invention, and it is therefore, intended to cover all such changes and modifications as fall within the true spirit and scope of the invention.

Having thus described our invention, what we claim and desire to protect by Letters Patent is:

1. In a tire mold for finish molding and vulcanizing a partly formed tire, in combination, a plurality of mold sections defining a mold cavity adapted to receive a partly finished tire, said mold sections having mating surface portions at which said mold sections respectively engage each other when said mold is closed, and said plurality of mold sections including a pair of opposed mold sections each having a tread-forming portion for forming a part of the tread of a tire located in said cavity; and vent means for providing a passage for air trapped in the mold cavity to escape to the exterior of the mold, said vent means including at least two but no more than four circumferentially spaced through-conduits extending through each of said pair of opposed mold sections from said cavity to the exterior of said mold, and a plurality of circumferentially spaced substantially radially extending grooves provided on at least one of each pair of said mating surfaces portions, said grooves extending from said cavity to the exterior of said mold, said through-conduits and said grooves constituting the only escape paths from said cavity to the exterior of said mold for trapped gaseous medium when the mold is closed.

2. A mold according to claim 1, wherein only two said through-conduits are provided in each of said opposed mold sections, said two through-conduits in each of said opposed sections being located substantially diametrically opposite to one another.

3. A mold according to claim 2, wherein said through-conduits are located in the region of said tread forming portions of said pair of opposed mold sections.

4. A mold according to claim 3, wherein said conduits are all located substantially in the same plane.

5. A mold according to claim 1, wherein each of said tread-forming portions comprises at least one circumferentially complete radially inwardly extending projection, said projection including at least one substantially axially extending bore for permitting air trapped between the mold and the tire located therein to tranfser from one side of said projection to the other side thereof after the tire surface has contacted the innermost portion of said projection.

6. A mold according to claim 1, wherein said plurality of mold sections includes a pair of toe-ring members for engaging opposite bead portions of a tire located in said cavity, said toe-ring members and said pair of opposed mold sections constituting all of said plurality of mold sections.

7. A mold according to claim 1, wherein said opposing mold sections include circumferentially extending tire-shoulder-forming portions adjacent said tread-forming portions, all of said through-conduits being located in the regions of said tread-forming portions which are adjacent said shoulder-forming portions.

8. A mold according to claim 7, wherein said shoulder-forming portions respectively comprise circumferential ribs extending radially inwardly into said cavity, each of said ribs being provided with a plurality of circumferentially spaced axial slots for providing paths for air to transfer from one side of said rib to the other.

9. A mold according to claim 8, wherein each of said opposing mold sections comprises a tire-sidewall-forming portion on the side of said shoulder-forming portion which is opposite said tread-forming portion, said sidewall-forming portions being provided with circumferentially spaced, radially extending flutes in the region closest to the axis of the mold.

10. A mold according to claim 9, wherein each of said opposing mold sections includes only two of said through-conduits, approximately 20 of said radial flutes, approximately 16 of said axial slots, approximately 16 of said axially extending bores, and a plurality of said radial grooves closely circumferentially spaced on said surface portions.

11. A mold according to claim 10, wherein said grooves are located only on one of each pair of mating surface portions, said grooves being approximately .020 inch deep and V-shaped, having an angle of approximately 60°.

12. A mold according to claim 11, wherein said through-conduits are substantially cylindrical and have a diameter of approximately .070 inch.

13. A mold according to claim 12, wherein said axially extending bores are located approximately $\frac{1}{32}$ to $\frac{1}{16}$ inch from the outermost surface of said tread-forming portion and have a diameter of approximately .070 inch.

References Cited

UNITED STATES PATENTS

| | | | |
|---|---|---|---|
| 1,380,085 | 5/1921 | Walton | 18—38 |
| 2,756,460 | 7/1956 | Heintz. | |
| 2,779,386 | 1/1957 | Waters. | |

FOREIGN PATENTS

| | | |
|---|---|---|
| 1,016,124 | 1/1966 | Great Britain. |

J. HOWARD FLINT, Jr., Primary Examiner

U.S. Cl. X.R.

18—44